US012603761B2

(12) United States Patent
Toyama

(10) Patent No.: US 12,603,761 B2
(45) Date of Patent: Apr. 14, 2026

(54) RECEIVER, CRYPTOGRAPHIC KEY DISTRIBUTION SYSTEM, METHOD FOR CONTROLLING RECEIVER, AND CONTROL PROGRAM

(71) Applicant: NEC Corporation, Tokyo (JP)

(72) Inventor: Hiroyuki Toyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 50 days.

(21) Appl. No.: 18/642,966

(22) Filed: Apr. 23, 2024

(65) Prior Publication Data

US 2024/0413978 A1 Dec. 12, 2024

(30) Foreign Application Priority Data

Jun. 7, 2023 (JP) ................................. 2023-094072

(51) Int. Cl.
*H04L 9/08* (2006.01)
(52) U.S. Cl.
CPC .......... *H04L 9/0819* (2013.01); *H04L 9/0852* (2013.01)
(58) Field of Classification Search
CPC .... H04L 9/0819; H04L 9/0852; H04L 9/0858
See application file for complete search history.

(56) References Cited

U.S. PATENT DOCUMENTS

2006/0083376 A1* 4/2006 Kawamoto ........... H04L 9/0852
380/256
2022/0393864 A1* 12/2022 Doi ........................ H04L 9/002

FOREIGN PATENT DOCUMENTS

JP 2022-186077 A 12/2022

* cited by examiner

*Primary Examiner* — Baotran N To
(74) *Attorney, Agent, or Firm* — Sughrue Mion, PLLC

(57) ABSTRACT

A receiver according to the present disclosure includes: a first modulation unit that modulates a phase of a reference light by using a reception base assigned so as to correspond to a transmission base assigned to each of a plurality of weak lights; a detection unit that detects a plurality of pieces of bit information from each of the plurality of weak lights interfered with by the reference light in which a base value of the reception base matches that of the transmission base; an extraction unit that extracts a plurality of pieces of bit information each having an amplitude component equal to or greater than a threshold; a prediction unit configured to predict a load status of the receiver based on information about a weather forecast; and an adjustment unit that adjusts the threshold in accordance with the predicted load status of the receiver.

17 Claims, 9 Drawing Sheets

RECEIVER, CRYPTOGRAPHIC KEY DISTRIBUTION SYSTEM, METHOD FOR CONTROLLING RECEIVER, AND CONTROL PROGRAM

INCORPORATION BY REFERENCE

This application is based upon and claims the benefit of priority from Japanese patent application No. 2023-94072, filed on Jun. 7, 2023, the disclosure of which is incorporated herein in its entirety by reference.

TECHNICAL FIELD

The present disclosure relates to a receiver, a cryptographic key distribution system, a method for controlling a receiver, and a control program.

BACKGROUND ART

In a cryptographic communication of a message from a transmission server to a reception server, the encryption of the message in the transmission server and the decryption of the message in the reception server are performed using a cryptographic key shared in advance by the transmission server and the reception server. In particular, the cryptographic communication in which a new cryptographic key is generated for each communication of a message is referred to as a cryptographic communication of a one-time pad scheme.

Further, in recent years, quantum cryptographic communication has been developed. The quantum cryptographic communication is a kind of a cryptographic communication of a one-time pad scheme, in which a cryptographic key generated by a transmitter on the transmission server side is superimposed on photons (light particles) which are the smallest units of light or a weak light and delivered from the transmitter to a receiver on the reception server side, whereby more secure cryptographic communication is enabled. A technology related to the quantum cryptographic communication is disclosed in, for example, Japanese Unexamined Patent Application Publication No. 2022-186077.

Japanese Unexamined Patent Application Publication No. 2022-186077 discloses a quantum cryptographic communication system that detects an anomaly based on at least one of wiring information of a QKD link connected to a quantum cryptography device to be inspected, weather information at a site where the quantum cryptography device to be inspected is installed, and quantum cryptography device information.

In the system disclosed in Japanese Unexamined Patent Application Publication No. 2022-186077, a reception apparatus (a receiver for photons) receives a certain amount of photons transmitted from a transmission apparatus regardless of the load status of the reception apparatus. Therefore, the system disclosed in Japanese Unexamined Patent Application Publication No. 2022-186077 has a problem that when the reception apparatus receives a certain amount of photons transmitted from the transmission apparatus although it is under heavy processing load conditions, the processing load on the reception apparatus increases.

SUMMARY

One of the objects of the present disclosure is to provide a receiver, a cryptographic key distribution system, a method for controlling a receiver, and a control program that solve the above-described problem.

A receiver according to one example aspect of the present disclosure is provided in a cryptographic key distribution system, the receiver including: a first modulation unit configured to modulate a phase of a reference light by using a reception base randomly assigned so as to correspond to a transmission base that is randomly assigned to each of a plurality of weak lights transmitted from a transmitter and received through a quantum communication path; a detection unit configured to cause the plurality of weak lights to be interfered with by the reference light the phase of which has been modulated by the first modulation unit, to thereby detect a plurality of pieces of bit information from each of the plurality of weak lights interfered with by the reference light in which a base value of the reception base matches that of the transmission base; an extraction unit configured to extract a plurality of pieces of bit information each having an amplitude component equal to or greater than a threshold from among the plurality of pieces of bit information detected by the detection unit; an acquisition unit configured to acquire information about a weather forecast in an area where, among the quantum communication paths, a quantum communication path installed on the ground is present; a prediction unit configured to predict a load status of the receiver based on the information about a weather forecast; and an adjustment unit configured to adjust the threshold in accordance with the load status of the receiver predicted by the prediction unit.

A method for controlling a receiver according to one example aspect of the present disclosure includes: modulating a phase of a reference light by using a reception base randomly assigned so as to correspond to a transmission base that is randomly assigned to each of a plurality of weak lights transmitted from a transmitter and received through a quantum communication path; causing the plurality of weak lights to be interfered with by the reference light the phase of which has been modulated, to thereby detect a plurality of pieces of bit information from each of the plurality of weak lights interfered with by the reference light in which a base value of the reception base matches that of the transmission base; extracting a plurality of pieces of bit information each having an amplitude component equal to or greater than a threshold from among the plurality of pieces of detected bit information; acquiring information about a weather forecast in an area where, among the quantum communication paths, a quantum communication path installed on the ground is present; predicting a load status of the receiver based on the information about a weather forecast; and adjusting the threshold in accordance with the predicted load status of the receiver.

A control program according to one example aspect of the present disclosure causes a computer to: modulate a phase of a reference light by using a reception base randomly assigned so as to correspond to a transmission base that is randomly assigned to each of a plurality of weak lights transmitted from a transmitter and received through a quantum communication path; cause the plurality of weak lights to be interfered with by the reference light the phase of which has been modulated, to thereby detect a plurality of pieces of bit information from each of the plurality of weak lights interfered with by the reference light in which a base value of the reception base matches that of the transmission base; extract a plurality of pieces of bit information each having an amplitude component equal to or greater than a threshold from among the plurality of pieces of detected bit information; acquire information about a weather forecast in an area where, among the quantum communication paths, a quantum communication path installed on the ground is present; predict a load status of the receiver based on the information about a weather forecast; and adjust the threshold in accordance with the predicted load status of the receiver.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Example embodiments will be described hereinafter with reference to the drawings. Note that since the drawings are drawn in a simplified manner, the technical scope of the example embodiments should not be narrowly interpreted based on the descriptions of the drawings. Further, the same elements are denoted by the same reference symbols, and redundant descriptions will be omitted.

In the following example embodiments, when necessary, the present disclosure is explained by using separate sections or separate example embodiments. However, those example embodiments are not unrelated with each other, unless otherwise specified. That is, they are related in such a manner that one example embodiment is a modified example, an application example, a detailed explanation, or a supplementary explanation of a part or the whole of another example embodiment. Further, in the following example embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may also be used.

Further, in the following example embodiments, their components (including operation steps and the like) are not necessarily essential except for cases where the component is explicitly specified or the component is obviously essential based on its principle. Similarly, in the following example embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

First Example Embodiment

<Outline of a Receiver Provided in a First Cryptographic Key Distribution System According to the Present Disclosure>

Figure 1:
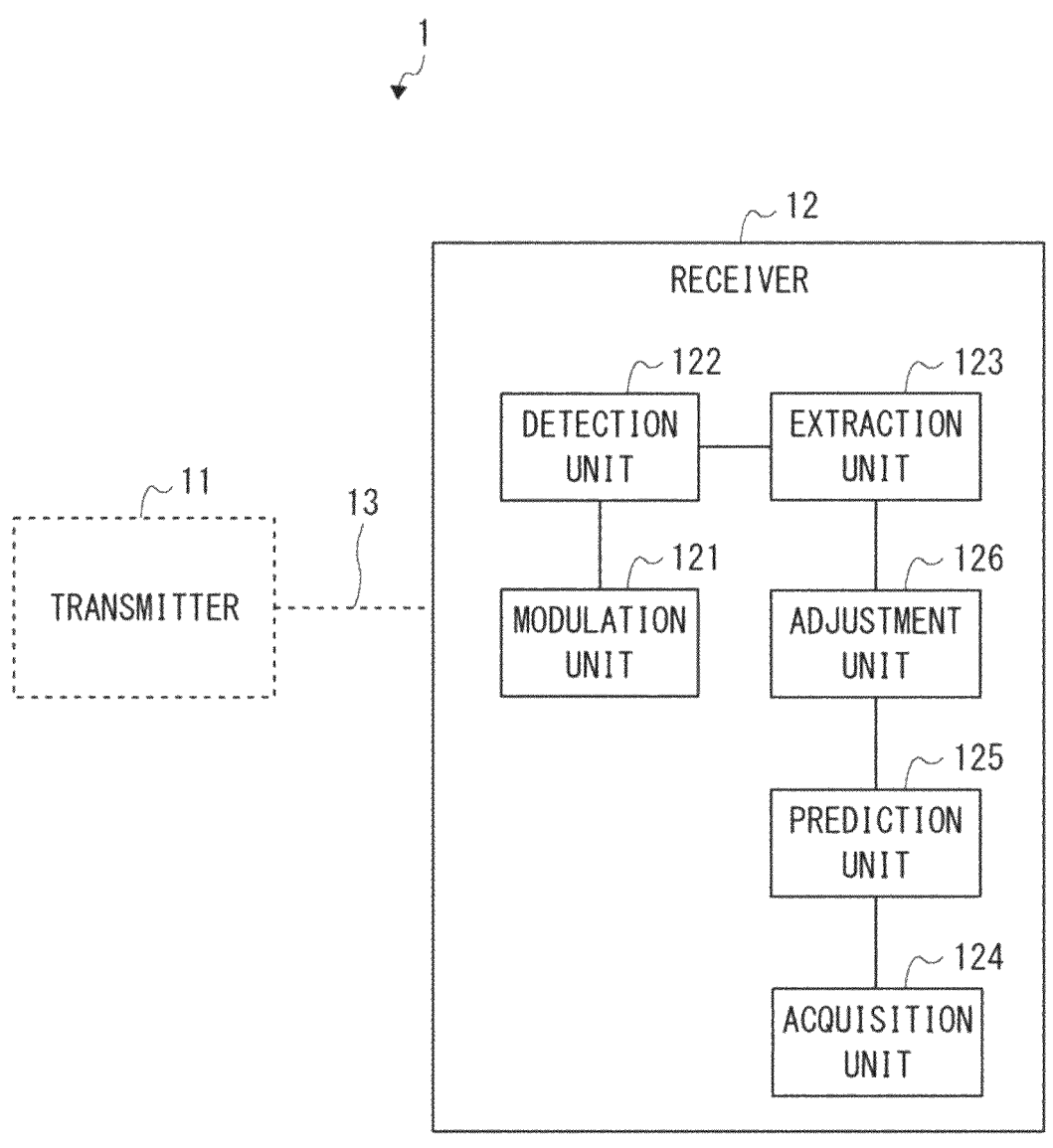
FIG. 1 is a block diagram showing an outline of a receiver provided in a first cryptographic key distribution system according to the present disclosure.

FIG. 1 is a block diagram showing an outline of a receiver 12 provided in a first cryptographic key distribution system 1 according to the present disclosure.

The cryptographic key distribution system 1, for example, is used for quantum cryptographic communication of a cryptographic key distribution scheme referred to as CV-QKD. In a cryptographic communication of a message from a transmission server to a reception server, the encryption of the message in the transmission server and the decryption of the message in the reception server are performed using a cryptographic key shared in advance by the transmission server and the reception server. In particular, the cryptographic communication in which a new cryptographic key is generated for each communication of a message is referred to as cryptographic communication of a one-time pad scheme.

The quantum cryptographic communication is a kind of a cryptographic communication of a one-time pad scheme, and the cryptographic key distribution system 1 superimposes a cryptographic key generated by a transmitter on the transmission server side on weak light and delivers it from the transmitter to a receiver on the reception server side, thereby enabling more secure cryptographic communication. Note that the weak light is, for example, light (quantum light) by which a quantum mechanical state change can be detected by setting a typical intensity of the light to be about one photon.

As shown in FIG. 1, in the cryptographic key distribution system 1, the receiver 12 includes a modulation unit 121, a detection unit 122, an extraction unit 123, an acquisition unit 124, a prediction unit 125, and an adjustment unit 126. Note that although the modulation unit 121, the detection unit 122, the extraction unit 123, the acquisition unit 124, the prediction unit 125, and the adjustment unit 126 are implemented by a hardware configuration (e.g., a circuit), the present disclosure is not limited thereto, and all or some of these units may be implemented by having a Central Processing Unit (CPU) execute a computer program as will be described later.

The receiver 12 receives a plurality of weak lights transmitted from a transmitter 11 through a quantum communication path 13. The quantum communication path 13 is, for example, an optical fiber through which light waves can be transmitted.

Note that each of the plurality of weak lights transmitted from the transmitter 11 includes information about a transmission bit and a transmission base randomly assigned in the transmitter 11. In other words, each of the phases of the plurality of weak lights transmitted from the transmitter 11 has been modulated using a transmission bit and a transmission base randomly assigned in the transmitter 11.

For example, when a bit value of the transmission bit is "0", the amount of phase modulation of 0 degrees is assigned, while when a bit value of the transmission bit is "1", the amount of phase modulation of 180 degrees is assigned. Further, when a base value of the transmission base is "X", the amount of phase modulation of 0 degrees is assigned, while when a base value of the transmission base is "Y", the amount of phase modulation of 90 degrees is assigned. The phase of each of the weak lights is modulated by an amount of phase modulation obtained by adding the amount of phase modulation corresponding to the bit value and the amount of phase modulation corresponding to the base value. Therefore, a weak light the phase of which has been modulated using the transmission base having a base value of "X" ideally appears on a real axis, and a weak light the phase of which has been modulated using the transmission base having a base value of "Y" ideally appears on an imaginary axis.

In the receiver 12, the modulation unit 121 modulates a phase of a reference light by using a reception base randomly assigned so as to correspond to a transmission base that is randomly assigned to each of a plurality of weak lights.

The detection unit 122 is, for example, a homodyne detector, and performs base matching for a plurality of received weak lights. Specifically, the detection unit 122 causes a plurality of weak lights to be interfered with by a reference light the phase of which has been modulated by the modulation unit 121, thereby detecting information (bit information) of a plurality of bit values from each of the plurality of weak lights interfered with by a reference light in which the base value of the reception base matches that of the transmission base. Note that the bit information includes a phase component representing a bit value and an amplitude component representing intensity of the bit value.

For example, when a base value of the reception base is "X", the amount of phase modulation of 0 degrees is assigned, while when a base value of the reception base is "Y", the amount of phase modulation of 90 degrees is assigned. Therefore, a desired bit information can be detected only when weak light and reference light, in which transmission and reception bases thereof match each other, interfere with each other.

After the detection unit 122 performs base matching, the extraction unit 123 performs post-selection. Specifically, the extraction unit 123 extracts a plurality of pieces of bit information each having an amplitude component equal to or greater than a threshold P from among the plurality of pieces of bit information detected by the detection unit 122. Note that the amplitude component of each bit information refers to an amplitude (a magnitude) of a difference signal which is the difference in intensity between light obtained by superimposing a reference light on a weak light and light having the opposite phase. Therefore, the threshold P is set in units of, for example, a difference in intensity of light or a potential difference corresponding to the difference in intensity of light. For example, when the amount of phase modulation is 0 degrees so as to correspond to the bit value of "0", the probability distribution of the difference signal is a Gaussian distribution in which an average value indicates a positive value. A threshold P+ of a positive value is set to the above difference signal. Further, when the amount of phase modulation is 180 degrees so as to correspond to the bit value of "1", the probability distribution of the difference signal is a Gaussian distribution in which an average value indicates a negative value. A threshold P− of a negative value is set to the above difference signal. Both of the absolute values of the thresholds P+ and P− are the thresholds P. Finally, the receiver 12 generates a cryptographic key by using only some of the bit values (bit strings) extracted by the extraction unit 123.

The acquisition unit 124 acquires information about a weather forecast in an area where, among the quantum communication paths 13, a quantum communication path 13 installed on the ground is present. The information about a weather forecast is information obtained by estimating a future state of a wind speed, an air temperature, and the like in a predetermined area based on the past or present state of the wind speed, the air temperature, and the like in the predetermined area. Further, among the quantum communication paths 13, a quantum communication path 13 installed on the ground is, for example, a quantum communication path disposed using a steel tower or the like so as to be high above the ground. Among the quantum communication paths 13, a quantum communication path 13 installed on the ground is hereinafter referred to as a quantum communication path 13a. For example, the acquisition unit 124 acquires information about a weather forecast in the area where the quantum communication path 13a is installed from an external apparatus (not shown) such as a meteorological satellite, or from the contents of an announcement by the Meteorological Agency and the like.

Note that the quantum communication path 13a installed on the ground is easily affected by a wind and an air temperature. For example, as the wind speed increases, the fluctuation of polarization in the quantum communication path 13a becomes larger, and thus the error rate increases. On the other hand, as the wind speed decreases, the fluctuation of polarization in the quantum communication path 13a becomes smaller, and thus the error rate decreases. Further, as the change in air temperature per predetermined period (e.g., one day) increases, the expansion and contraction rate of the quantum communication path 13a increases, and thus the error rate increases. On the other hand, as the change in air temperature per predetermined period becomes smaller, the expansion and contraction rate of the quantum communication path 13a decreases, and thus the error rate decreases.

The prediction unit 125 predicts a load status of the receiver 12 based on information about a weather forecast acquired by the acquisition unit 124. For example, when the information about a weather forecast includes information indicating that the wind speed will increase, the prediction unit 125 predicts that the processing load on the receiver 12 will increase. On the other hand, when the information about a weather forecast includes information indicating that the wind speed will decrease, the prediction unit 125 predicts that the processing load on the receiver 12 will decrease. Further, when, for example, the information about a weather forecast includes information indicating that the change in the air temperature per predetermined period (e.g., one day) will increase, the prediction unit 125 predicts that the processing load on the receiver 12 will increase. On the other hand, when the information about a weather forecast includes information indicating that the change in the air temperature per predetermined period will decrease, the prediction unit 125 predicts that the processing load on the receiver 12 will decrease.

Note that the prediction unit 125 may have a function of performing machine learning of a model representing a relationship between information about a weather forecast in the area where the quantum communication path 13a is installed and a predicted value of the load status of the receiver 12 by using the information about a weather forecast in the area where the quantum communication path 13a is installed and the actual load status of the receiver 12 corresponding to this information. In this case, the prediction unit 125 predicts the load status of the receiver 12 based on the information about a weather forecast in the area where the quantum communication path 13a is installed using the trained model.

The adjustment unit 126 adjusts the threshold P in accordance with the load status of the receiver 12 (the future load status of the receiver 12) predicted by the prediction unit 125. More specifically, the adjustment unit 126 adjusts the threshold P in accordance with the load status of a processor that performs predetermined processing in the receiver 12 predicted by the prediction unit 125.

For example, the adjustment unit 126 increases the threshold P as the processing load on the receiver 12 predicted by the prediction unit 125 increases. By doing so, a bit value extracted by the extraction unit 123 is limited to a more reliable bit value, and thus the error rate between a transmission bit and a reception bit is reduced. As a result, the processing load on the receiver 12 is reduced. Further, the adjustment unit 126 decreases the threshold P as the processing load on the receiver 12 predicted by the prediction unit 125 decreases. By doing so, a bit value extracted by the extraction unit 123 increases, and thus the number of bit values used to generate a cryptographic key increases. As a result, the number of generated keys increases.

After that, the transmitter 11 and the receiver 12 perform error correction processing. Specifically, when an error rate between the bit string extracted by the transmitter 11 and the bit string extracted by the receiver 12 is less than a predetermined rate, the transmitter 11 and the receiver 12 perform processing for matching mismatched parts of the above bit strings to each other. Note that, when the error rate is equal to or greater than a predetermined rate, the process returns to the generation of a weak light by the transmitter 11 since it is not suitable for the generation of a cryptographic key.

After that, in the transmitter 11 and the receiver 12, confidentiality enhancement processing is performed on the bit strings on which the error correction has been performed, and as a result, cryptographic keys (i.e., shared cryptographic keys) the bit strings of which match each other are individually generated.

As described above, the receiver 12 provided in the cryptographic key distribution system 1 according to the present disclosure adjusts the threshold P, which is the lowest value of the amplitude component of bit information extracted by the extraction unit 123, in accordance with the load status of the receiver 12 predicted based on a weather forecast and the like. Thus, the receiver 12 can generate a cryptographic key shared with the transmitter 11 without increasing the processing load thereon.
<Outline of the First Cryptographic Key Distribution System According to the Present Disclosure>

Figure 2:
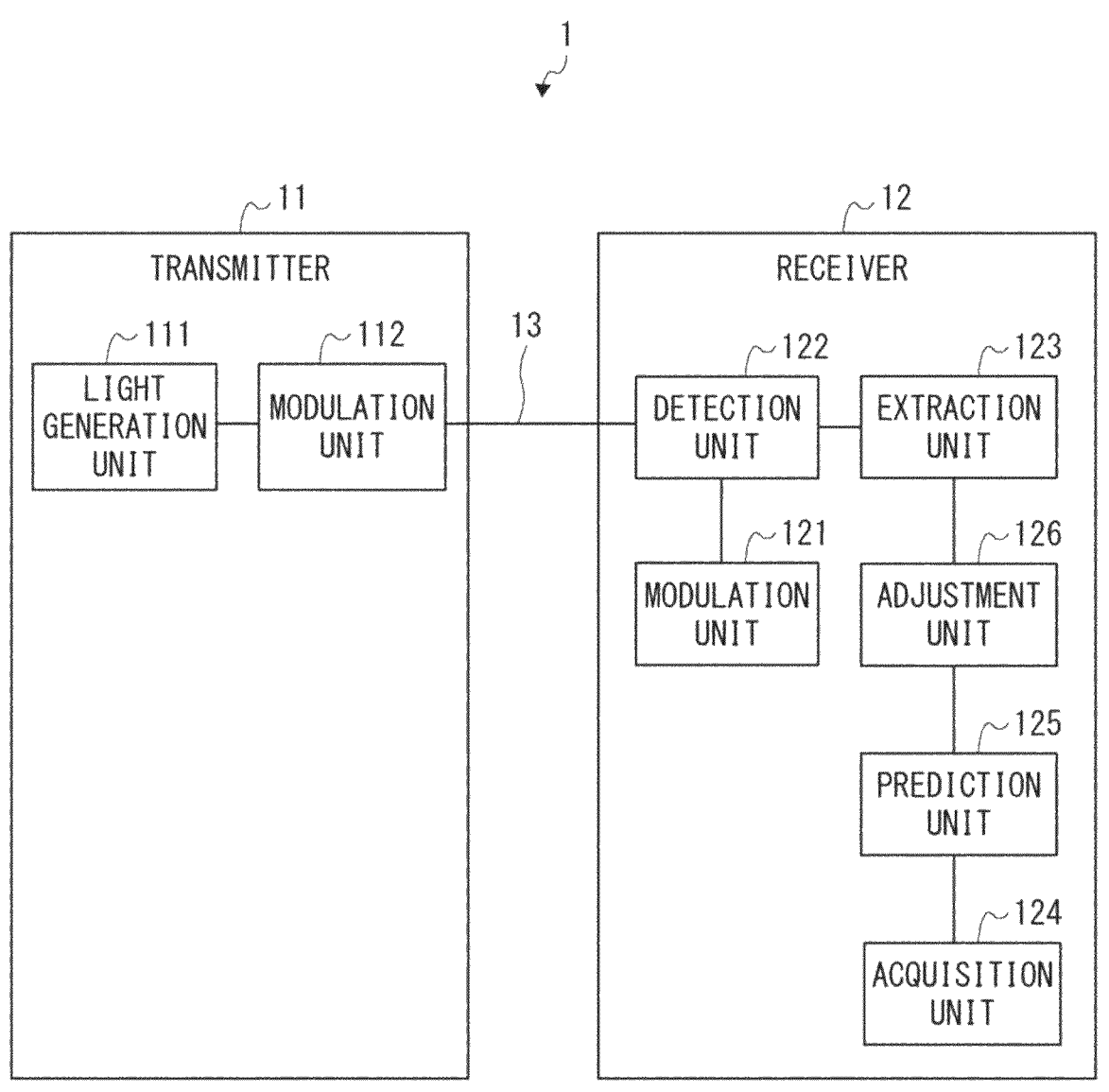
FIG. 2 is a block diagram showing an outline of the first cryptographic key distribution system according to the present disclosure.

FIG. 2 is a block diagram showing an outline of the first cryptographic key distribution system 1 according to the present disclosure.

As shown in FIG. 2, the cryptographic key distribution system 1 includes the transmitter 11, the receiver 12, and the quantum communication path 13.

The transmitter 11 includes a light generation unit 111 and a modulation unit 112. The light generation unit 111 generates a plurality of weak lights. The modulation unit 112 modulates the phases of the plurality of weak lights generated by the light generation unit 111 one by one using a transmission bit and a transmission base randomly selected in the transmitter 11. For example, a random number generated by a random number generation unit (not shown) is used as a bit value of the transmission bit. The plurality of weak lights the phases of which have been modulated by the modulation unit 112 are transmitted to the receiver 12 through the quantum communication path 13. Since the configuration and the operations of the receiver 12 are as described above, the descriptions thereof will be omitted.

In the cryptographic key distribution system 1 according to the present disclosure, the receiver 12 adjusts the threshold P, which is the lowest value of the amplitude component of bit information extracted by the extraction unit 123, in accordance with the load status of the receiver 12 predicted based on a weather forecast and the like. Thus, the cryptographic key distribution system 1 can generate a cryptographic key shared by the transmitter 11 and the receiver 12 without increasing the processing load on the receiver 12.
<Details of the First Cryptographic Key Distribution System According to the Present Disclosure>

Figure 3:
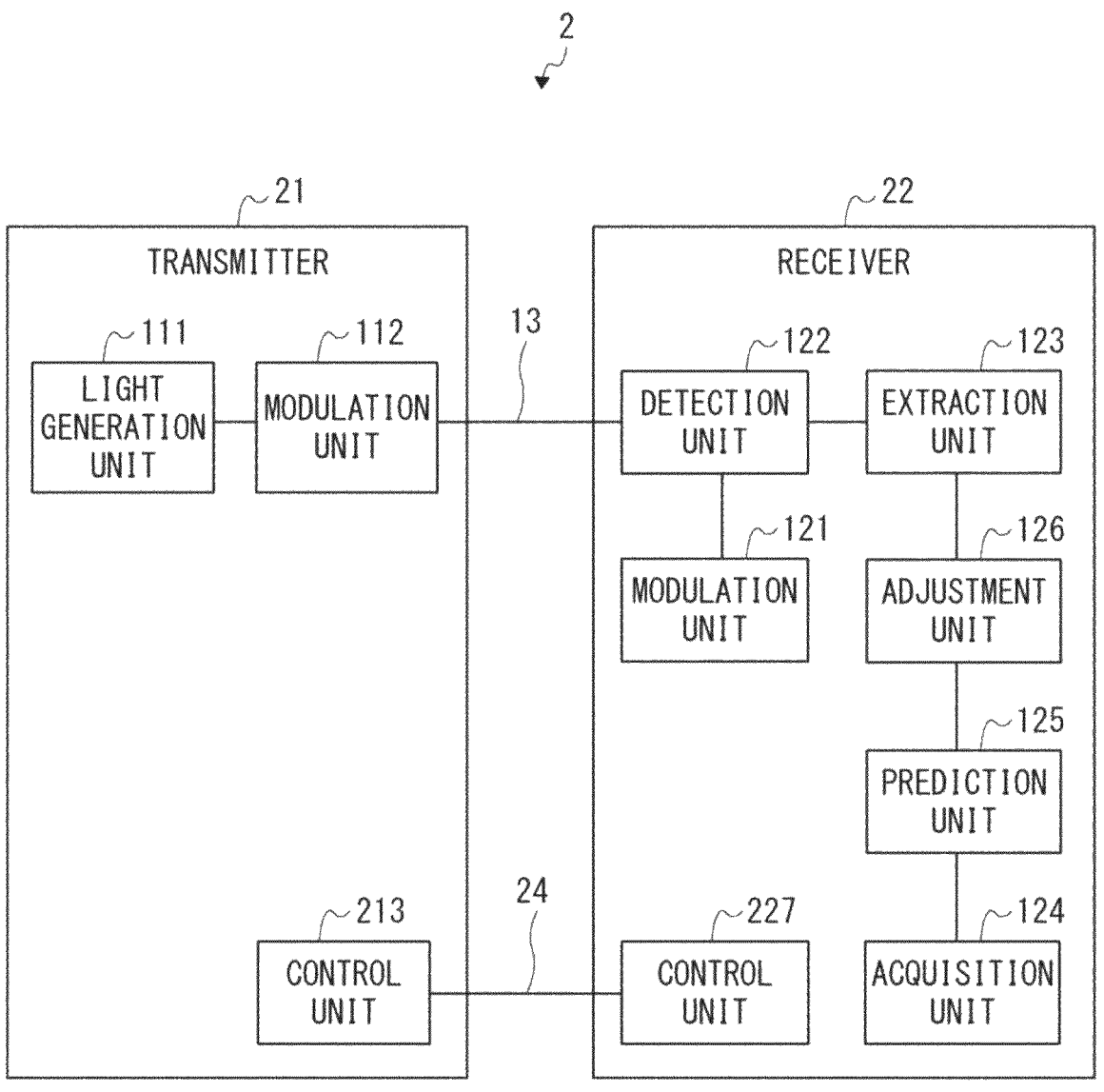
FIG. 3 is a block diagram showing details of the first cryptographic key distribution system according to the present disclosure.

FIG. 3 is a block diagram showing details of the first cryptographic key distribution system 1 according to the present disclosure as a cryptographic key distribution system 2. The cryptographic key distribution system 2 includes a transmitter 21, a receiver 22, the quantum communication path 13, and a classical communication path 24. The transmitter 21 and the receiver 22 respectively correspond to the transmitter 11 and the receiver 12 in the cryptographic key distribution system 1.

The transmitter 21 differs from the transmitter 11 in that it further includes a control unit 213 in addition to the light generation unit 111 and the modulation unit 112. The receiver 22 differs from the receiver 12 in that it further includes a control unit 227 in addition to the modulation unit 121, the detection unit 122, the extraction unit 123, the acquisition unit 124, the prediction unit 125, and the adjustment unit 126. The control unit 213 and the control unit 227 are configured so that they can communicate with each other through the classical communication path 24. A description will be given below of the cryptographic key distribution system 2 with a focus on differences between it and the cryptographic key distribution system 1.

Figure 4:
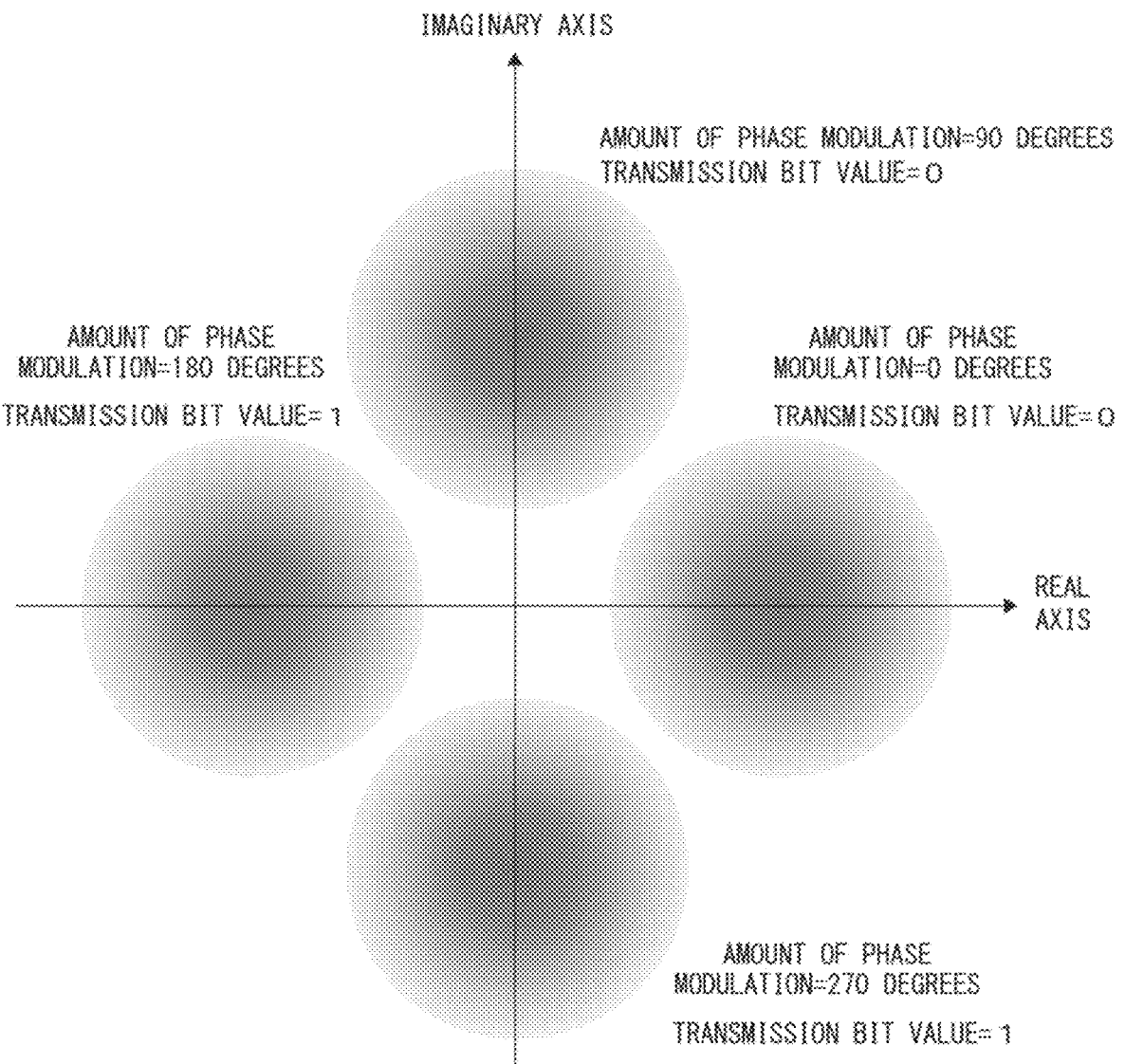
FIG. 4 is a diagram showing a distribution of a plurality of bit values of a receiver provided in the cryptographic key distribution system shown in FIG. 3 after base matching is performed.

FIG. 4 is a diagram showing a distribution of a plurality of pieces of bit information detected by the detection unit 122. That is, FIG. 4 is a diagram showing a distribution of a plurality of pieces of bit information of the receiver 22 after base matching is performed. In the example shown in FIG. 4, the horizontal axis indicates the real axis, and the vertical axis indicates the imaginary axis. In FIG. 4, the color of each circle becomes darker as the distribution of bit information increases, while the color of each circle becomes lighter as the distribution of bit information is reduced.

Figure 5:
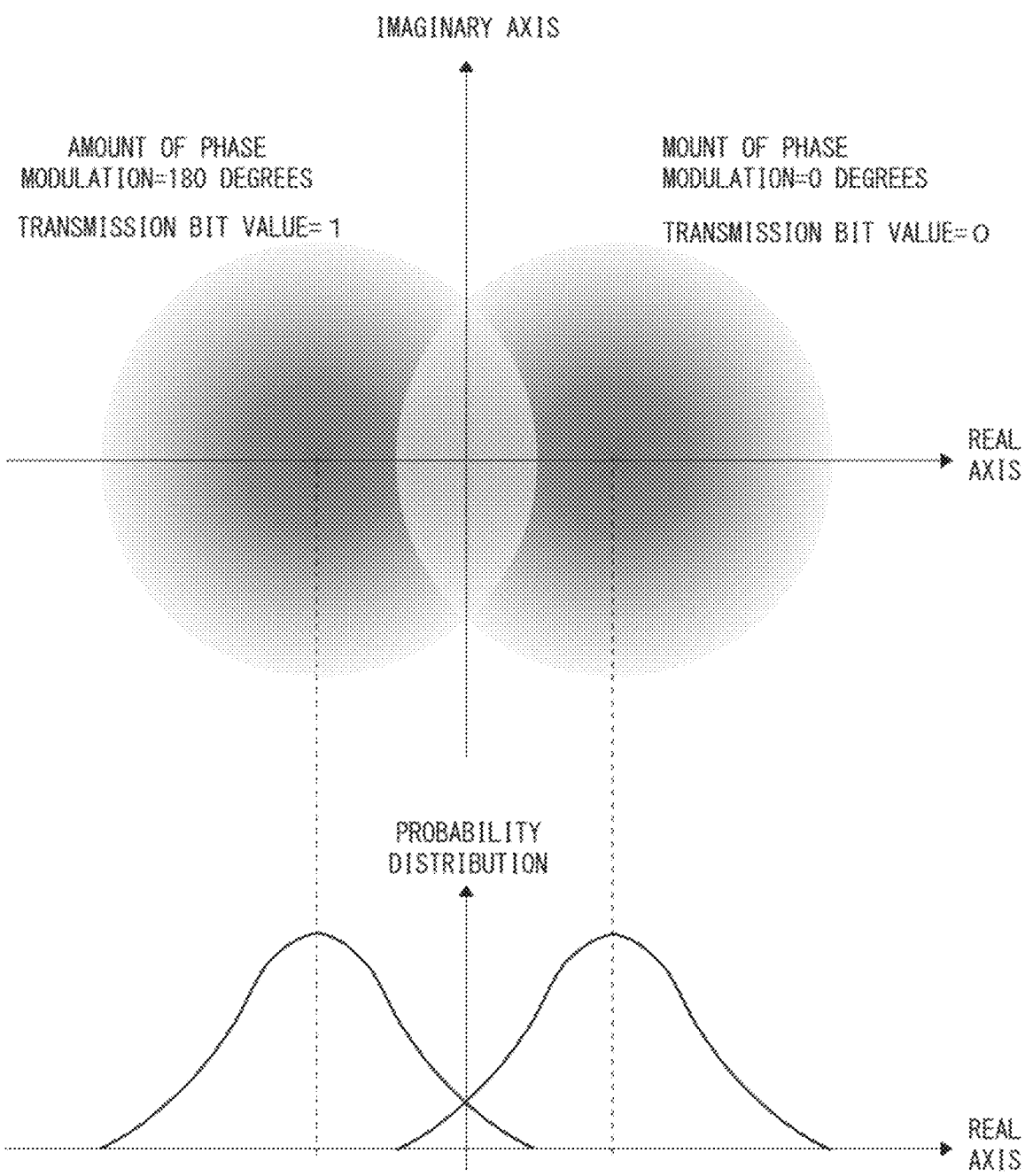
FIG. 5 is a diagram showing details of the distribution of a plurality of bit values of the receiver provided in the cryptographic key distribution system shown in FIG. 3 after base matching is performed.

Further, FIG. 5 is a diagram showing details of the distribution of bit information the base value of which is "X", that is, bit information near the real axis, among the plurality of pieces of bit information of the receiver 22 after base matching is performed. In the example shown in the upper side of FIG. 5, the horizontal axis indicates the real axis, and the vertical axis indicates the imaginary axis. In the diagram shown in the upper side of FIG. 5, the color of each circle becomes darker as the distribution of bit information increases, while the color of each circle becomes lighter as the distribution of bit information is reduced. Further, in the example shown in the lower side of FIG. 5, the horizontal axis indicates a value of the amplitude component of bit information (the amplitude of the difference signal described above) on the real axis, and the vertical axis indicates a probability that bit information will be detected.

Although only the distribution of bit information the base value of which is "X", that is, bit information near the real axis, among the plurality of pieces of bit information detected by the detection unit 122 will be described below, basically a similar phenomenon has occurred in the distribution of bit information the base value of which is "Y", that is, bit information near the imaginary axis.

As shown in FIG. 5, weak lights (bit information) the phases of which have been modulated based on the transmission bit having a bit value of "0" are distributed so that the average values thereof are located on the positive side of the real axis since the amount of phase modulation is 0 degrees. Further, weak lights (bit information) the phases of which have been modulated based on the transmission bit having a bit value of "1" are distributed so that the average values thereof are located on the negative side of the real axis since the amount of phase modulation is 180 degrees. Note that, by the weak light having a weak intensity, especially the weak light having an intensity so weak that it overlaps with a weak light having a phase different by 180 degrees from the former weak light, a correct bit value may not be detected due to quantum fluctuations.

Figure 6:
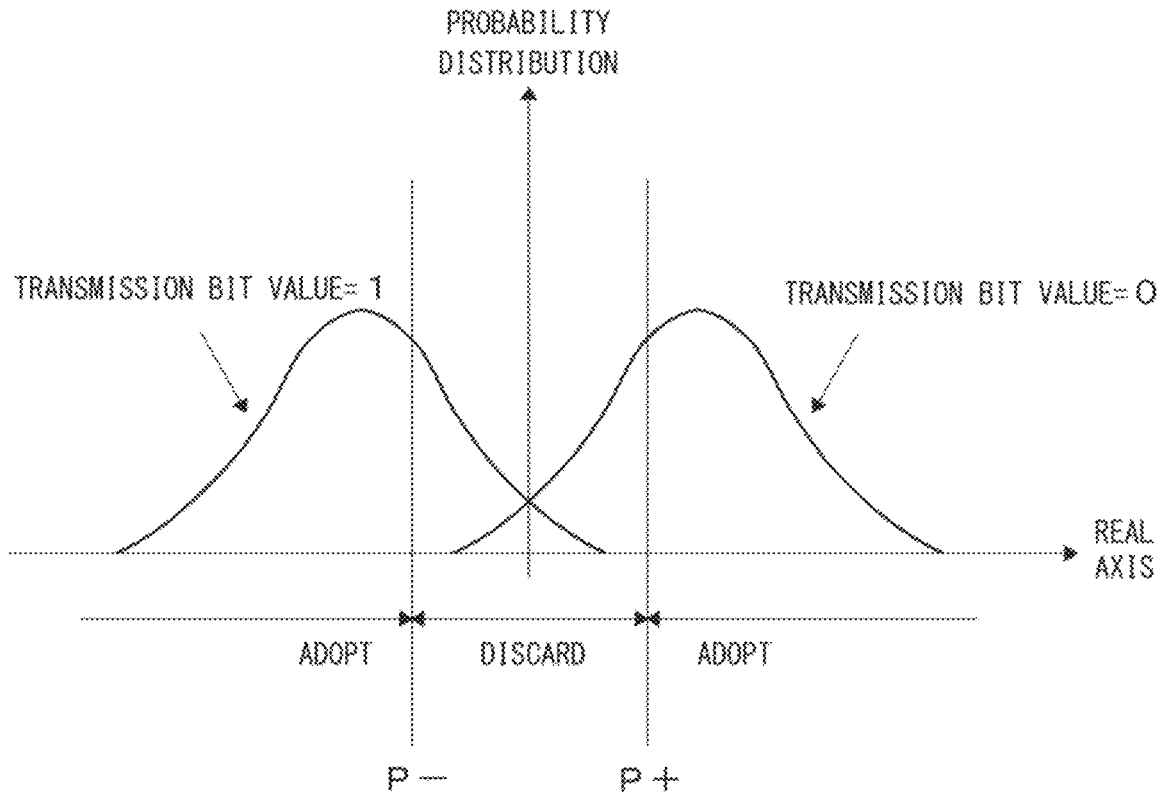
FIG. 6 is a diagram for explaining a method for extracting bit values by an extraction unit of the receiver provided in the cryptographic key distribution system shown in FIG. 3.

Therefore, in the cryptographic key distribution system 2, as shown in FIG. 6, the threshold P, which is the lowest value of the amplitude component of the bit information extracted by the extraction unit 123, is set in the receiver 22. More specifically, when the amount of phase modulation is 0 degrees so as to correspond to the bit value "0", the probability distribution of the bit information is a Gaussian distribution in which an average value indicates a positive value. The threshold P+ of a positive value is set to the above distribution of bit information. Further, when the amount of phase modulation is 180 degrees so as to correspond to the bit value of "1", the probability distribution of bit information is a Gaussian distribution in which an average value indicates a negative value. The threshold P− of a negative value is set to the above distribution of bit information. Both of the absolute values of the thresholds P+ and P− are the thresholds P. Then, the extraction unit 123 extracts bit information the amplitude component of which is equal to or greater than the threshold P from among the plurality of pieces of bit information (i.e., bit information after base matching is performed) detected by the detection unit 122, and discards bit information the amplitude component of which is less than the threshold P.

Figure 7:
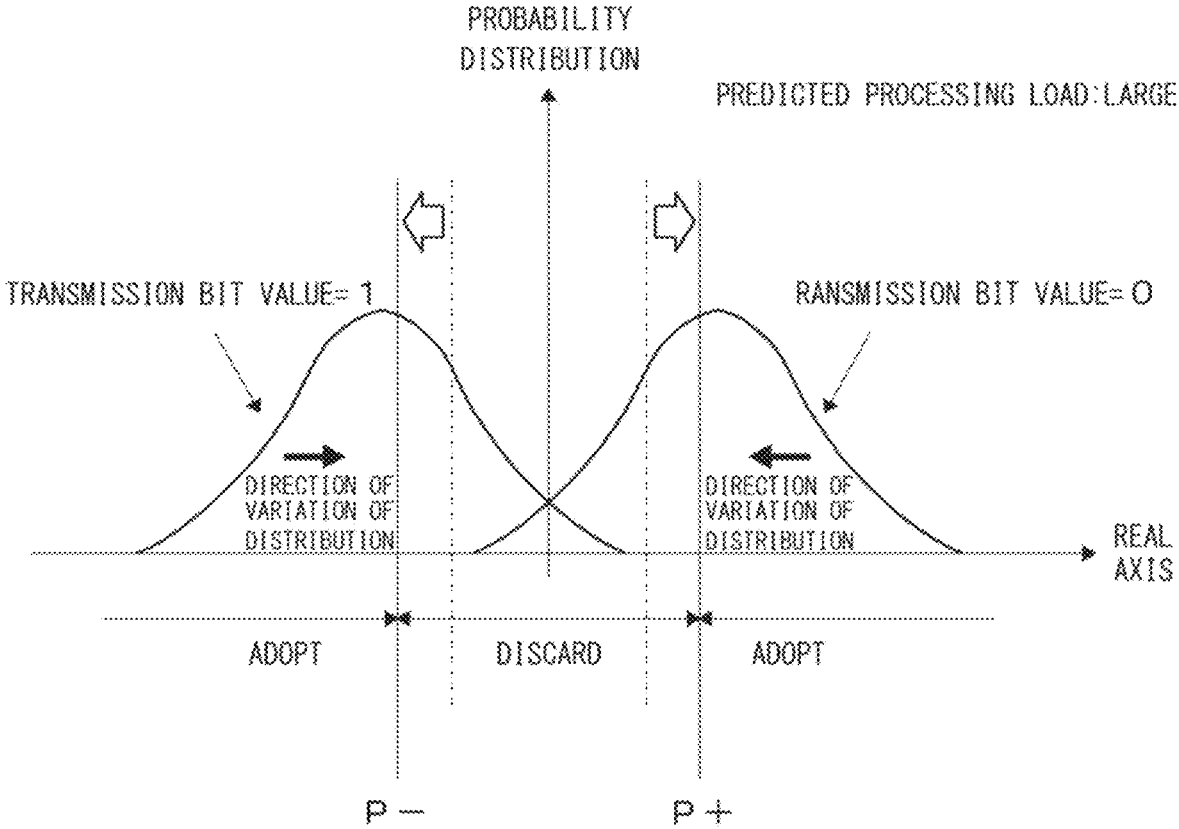
FIG. 7 is a diagram for explaining a method for extracting bit values by the extraction unit of the receiver provided in the cryptographic key distribution system shown in FIG. 3.
Figure 8:
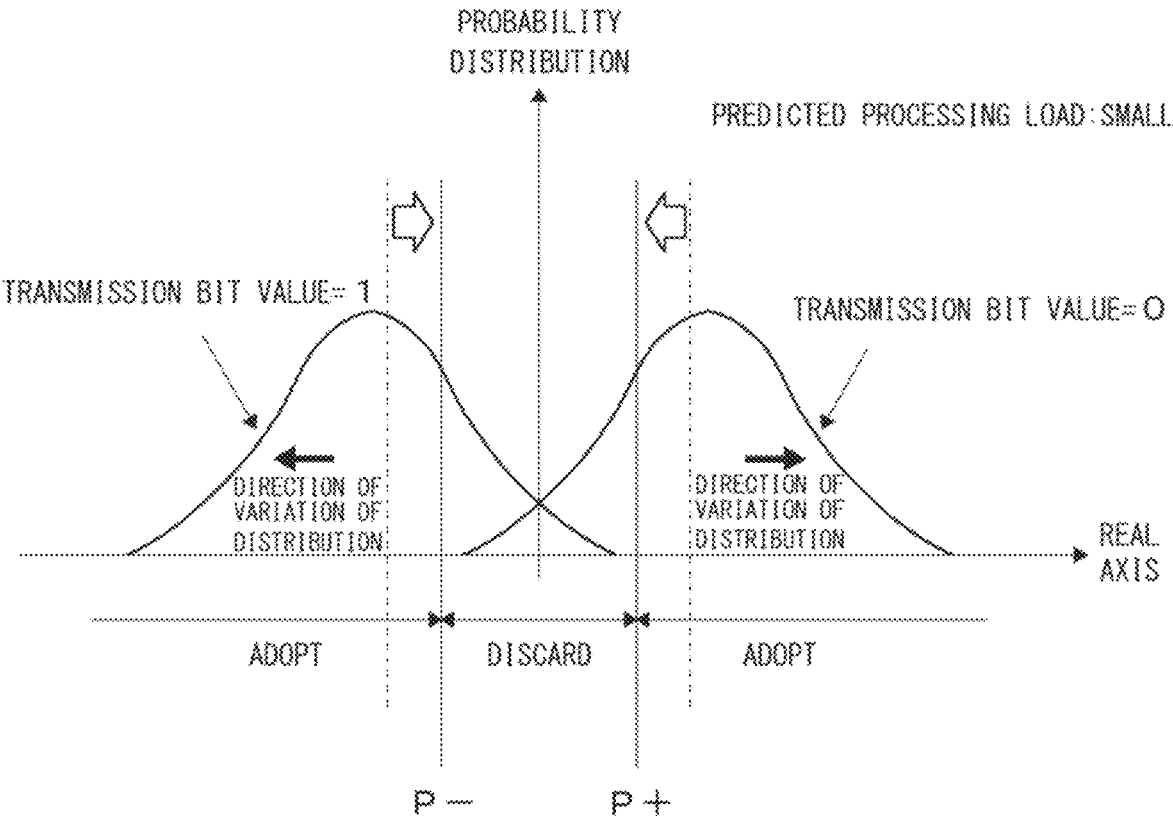
FIG. 8 is a diagram for explaining a method for extracting bit values by the extraction unit of the receiver provided in the cryptographic key distribution system shown in FIG. 3.

Further, in the cryptographic key distribution system 2, as shown in FIGS. 7 and 8, the receiver 22 adjusts the threshold P in accordance with the load status of the receiver 22 (the future load status of the receiver 22) predicted based on a weather forecast and the like.

For example, the adjustment unit 126 increases the threshold P as the processing load on the receiver 22 predicted by the prediction unit 125 increases (see FIG. 7). By doing so, a bit value extracted by the extraction unit 123 is limited to a more reliable bit value, and thus the error rate between a transmission bit and a reception bit is reduced. As a result, the processing load on the receiver 22 is reduced. Further, the adjustment unit 126 decreases the threshold P as the processing load on the receiver 22 predicted by the prediction unit 125 decreases (see FIG. 8). By doing so, a bit value extracted by the extraction unit 123 increases, and thus the number of bit values used to generate a cryptographic key increases. As a result, the number of generated keys increases.

The control unit 213 and the control unit 227 deliver information required to generate a cryptographic key through the classical communication path 24. For example, the control unit 213 and the control unit 227 deliver synchronization signals for operating the transmitter 21 and the receiver 22 in synchronization with each other. Further, the control unit 213 and the control unit 227 deliver identification information for associating a plurality of weak lights transmitted from the transmitter 21 with a plurality of weak lights received by the receiver 22.

Further, the control unit 213 and the control unit 227 perform error correction processing after base matching and post-selection are performed. Specifically, when an error rate between the bit string (key information) extracted by the transmitter 21 and the bit string (key information) extracted by the receiver 22 is less than a predetermined rate, the control unit 213 and the control unit 227 perform processing for matching mismatched parts of the bit string extracted by the transmitter 21 and the bit string extracted by the receiver 22 to each other. Note that, when the error rate is greater than a predetermined rate, the process returns to the generation of a photon by the transmitter 21 since it is not suitable for the generation of a cryptographic key.

After that, the control unit 213 and the control unit 227 perform confidentiality enhancement processing on the bit strings on which the error correction has been performed, and individually generate cryptographic keys (i.e., shared cryptographic keys) the bit strings of which match each other.

As described above, in the cryptographic key distribution system 2 according to the present disclosure, the receiver 22 adjusts the threshold P, which is the lowest value of the amplitude component of bit information extracted by the extraction unit 123, in accordance with the load status of the receiver 22 predicted based on a weather forecast and the like. Thus, the cryptographic key distribution system 2 can generate a cryptographic key shared by the transmitter 21 and the receiver 22 without increasing the processing load on the receiver 22.

Second Example Embodiment

Figure 9:
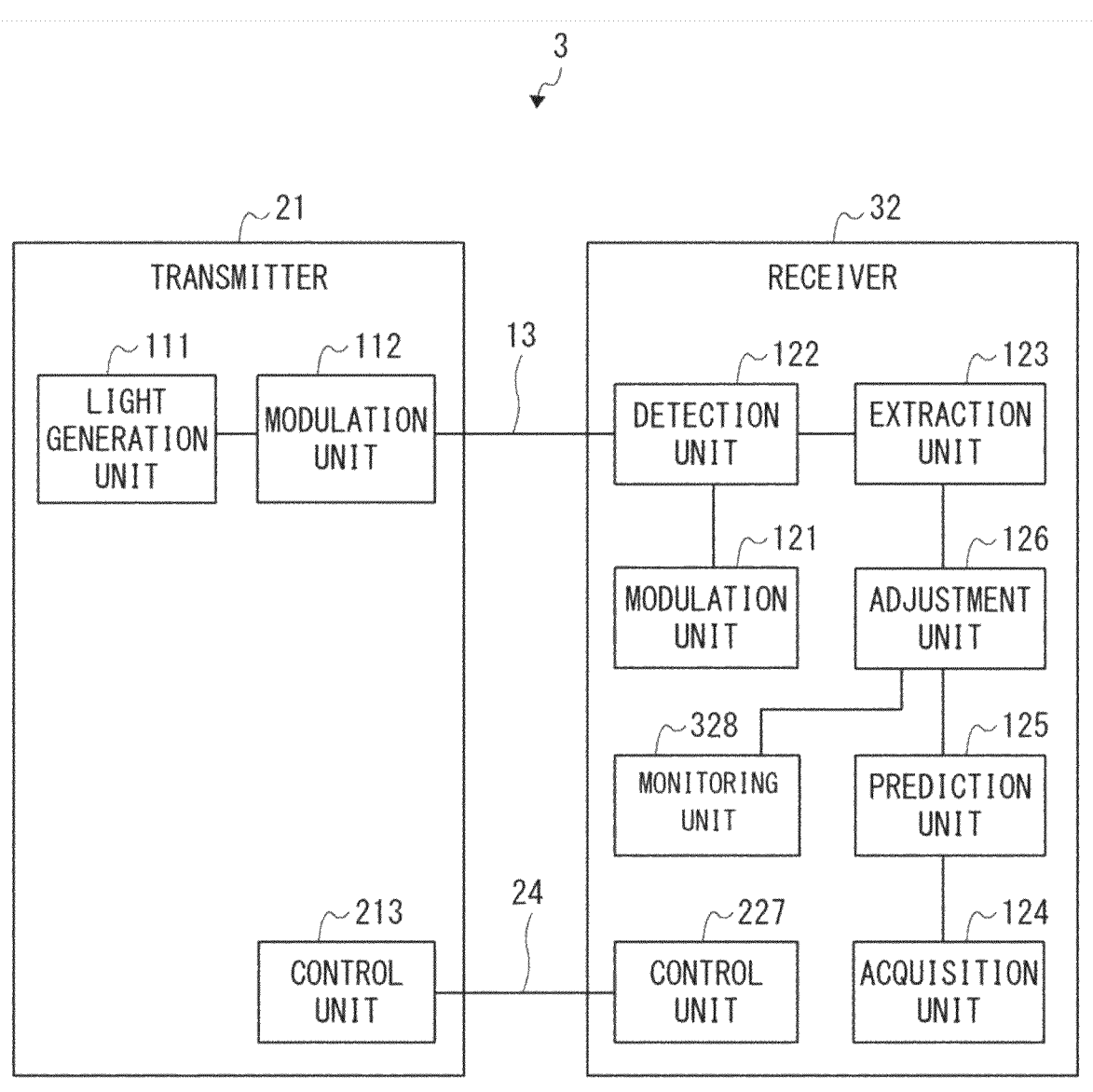
FIG. 9 is a block diagram showing an example of a configuration of a second cryptographic key distribution system according to the present disclosure.

FIG. 9 is a block diagram showing an example of a configuration of a second cryptographic key distribution system 3 according to the present disclosure. The cryptographic key distribution system 3 differs from the cryptographic key distribution system 2 in that it includes a receiver 32 instead of the receiver 22. The receiver 32 differs from the receiver 22 in that it further includes a monitoring unit 328. The configurations of the cryptographic key distribution system 3 other than the above one are similar to those of the cryptographic key distribution system 2, and thus the descriptions thereof will be omitted.

In the receiver 32, the monitoring unit 328 monitors a current load status of the receiver 32. The adjustment unit 126 adjusts the threshold P based on a result of the monitoring by the monitoring unit 328 and a result of the prediction by the prediction unit 125. For example, the adjustment unit 126 increases the threshold P as the current processing load on the receiver 32 monitored by the monitoring unit 328 increases, and decreases the threshold P as the current processing load on the receiver 32 monitored by the monitoring unit 328 decreases. Then, as described above, the adjustment unit 126 adjusts the threshold P based on a result of the prediction by the prediction unit 125.

Note that the monitoring unit 328 is not limited to directly monitoring the load status of the receiver 32, and may indirectly or supplementarily monitor the load status of the receiver 32. For example, the adjustment unit 126 may adjust the threshold P in accordance with the temperature and the vibration of the quantum communication path 13, which is an optical fiber, monitored by the monitoring unit 328. Note that the temperature and the vibration of the quantum communication path 13 are detected, for example, by a temperature sensor or a vibration sensor. Further, the monitoring performed by the monitoring unit 328 may be monitoring as to whether or not a load status is within a certain range, in which case the adjustment of the threshold P performed by the adjustment unit 126 may be an adjustment of the threshold P to a threshold P calculated in advance appropriate for the load status.

For example, the adjustment unit 126 may determine that the processing load on the receiver 32 increases as the temperature of the quantum communication path 13 increases, and then increase the threshold P. Alternatively, the adjustment unit 126 may determine that the processing load on the receiver 32 decreases as the temperature of the quantum communication path 13 decreases, and then decrease the threshold P. Further, the adjustment unit 126 may determine that the processing load on the receiver 32 increases as the vibration of the quantum communication path 13 increases, and then increase the threshold P. Alternatively, the adjustment unit 126 may determine that the processing load on the receiver 32 decreases as the vibration of the quantum communication path 13 decreases, and then decrease the threshold P.

As described above, in the cryptographic key distribution system 3 according to the present disclosure, the receiver 32 adjusts the threshold P, which is the lowest value of the amplitude component of bit information extracted by the extraction unit 123, in accordance with the current load status of the receiver 32 and the future load status of the receiver 32 predicted based on a weather forecast and the like. Thus, the cryptographic key distribution system 3 can generate a cryptographic key shared by the transmitter 21 and the receiver 32 without increasing the processing load on the receiver 32.

Note that, in the present disclosure, it is possible to implement some or all of the processes performed in the cryptographic key distribution system or the receiver provided therein by causing a CPU to execute a computer program.

Specifically, the above-described program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies. By way of example, and not a limitation, non-transitory computer readable media or tangible storage media can further include a CD-ROM, a Digital Versatile Disc (DVD), a Blu-ray (Registered Trademark) disc or other types of optical disc storages. By way of example, and not a limitation, non-transitory computer readable media or tangible storage media can further include a magnetic cassette, a magnetic tape, and a magnetic disc storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. Further, each example embodiment can be appropriately combined with at least one of example embodiments.

The present disclosure can provide a receiver, a cryptographic key distribution system, a method for controlling a receiver, and a control program that are capable of generating a cryptographic key without increasing the processing load on the receiver.

The first and second example embodiments can be combined as desirable by one of ordinary skill in the art. While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

Further, the whole or part of the example embodiments disclosed above can be described as, but not limited to, the following supplementary notes.

(Supplementary Note 1)

A receiver provided in a cryptographic key distribution system, the receiver comprising:

a first modulation unit configured to modulate a phase of a reference light by using a reception base randomly assigned so as to correspond to a transmission base that is randomly assigned to each of a plurality of weak lights transmitted from a transmitter and received through a quantum communication path;

a detection unit configured to cause the plurality of weak lights to be interfered with by the reference light the phase of which has been modulated by the first modulation unit, to thereby detect a plurality of pieces of bit information from each of the plurality of weak lights interfered with by the reference light in which a base value of the reception base matches that of the transmission base;

an extraction unit configured to extract a plurality of pieces of bit information each having an amplitude component equal to or greater than a threshold from among the plurality of pieces of bit information detected by the detection unit;

an acquisition unit configured to acquire information about a weather forecast in an area where, among the quantum communication paths, a quantum communication path installed on the ground is present;

a prediction unit configured to predict a load status of the receiver based on the information about a weather forecast; and an adjustment unit configured to adjust the threshold in accordance with the load status of the receiver predicted by the prediction unit.

(Supplementary Note 2)

The receiver according to supplementary note 1, wherein the adjustment unit increases the threshold as a processing load on the receiver predicted by the prediction unit increases, while the adjustment unit decreases the threshold as a processing load on the receiver predicted by the prediction unit decreases.

(Supplementary Note 3)

The receiver according to supplementary note 1, wherein when the information about a weather forecast includes information indicating that an amount of change in air temperature in a predetermined period will increase, the prediction unit predicts that the processing load on the receiver will increase, while when the information about a weather forecast includes information indicating that an amount of change in air temperature in a predetermined period will decrease, the prediction unit predicts that the processing load on the receiver will decrease.

(Supplementary Note 4)

The receiver according to supplementary note 1, wherein when the information about a weather forecast includes information indicating that a wind speed will increase, the prediction unit predicts that the processing load on the receiver will increase, while when the information about a weather forecast includes information indicating that a wind speed will decrease, the prediction unit predicts that the processing load on the receiver will decrease.

(Supplementary Note 5)

The receiver according to supplementary note 1, further comprising a monitoring unit configured to monitor the load status of the receiver, wherein the adjustment unit adjusts the threshold in accordance with the load status of the receiver monitored by the monitoring unit and the load status of the receiver predicted by the prediction unit.

(Supplementary Note 6)

A cryptographic key distribution system comprising:
the transmitter;
the receiver according to supplementary note 1; and
a quantum communication path provided between the transmitter and the receiver, wherein
the transmitter comprises:
a light generation unit configured to generate the plurality of weak lights, and
a second modulation unit configured to modulate phases of the plurality of weak lights one by one using bit information and a transmission base randomly selected in the transmitter, and transmit the plurality of weak lights the phases of which have been modulated to the receiver through the quantum communication path.

(Supplementary Note 7)

The cryptographic key distribution system according to supplementary note 6, wherein
the transmitter further comprises a first control unit configured to generate a first cryptographic key by using, among a plurality of pieces of bit information included in each of the plurality of weak lights the phases of which have been modulated by the second modulation unit, at least some of the plurality of pieces of bit information to which a transmission base, a base value of which matches that of a reception base assigned in the receiver, is assigned, and
the receiver further comprises a second control unit configured to generate a second cryptographic key by using at least some of the plurality of pieces of bit information extracted by the extraction unit.

(Supplementary Note 8)

The cryptographic key distribution system according to supplementary note 6, wherein the quantum communication path is an optical fiber.

(Supplementary Note 9)

A method for controlling a receiver, the method comprising:
modulating a phase of a reference light by using a reception base randomly assigned so as to correspond to a transmission base that is randomly assigned to each of a plurality of weak lights transmitted from a transmitter and received through a quantum communication path;
causing the plurality of weak lights to be interfered with by the reference light the phase of which has been modulated, to thereby detect a plurality of pieces of bit information from each of the plurality of weak lights interfered with by the reference light in which a base value of the reception base matches that of the transmission base;
extracting a plurality of pieces of bit information each having an amplitude component equal to or greater than a threshold from among the plurality of pieces of detected bit information;
acquiring information about a weather forecast in an area where, among the quantum communication paths, a quantum communication path installed on the ground is present;
predicting a load status of the receiver based on the information about a weather forecast; and
adjusting the threshold in accordance with the predicted load status of the receiver.

(Supplementary Note 10)

A control program for causing a computer to:
modulate a phase of a reference light by using a reception base randomly assigned so as to correspond to a transmission base that is randomly assigned to each of a plurality of weak lights transmitted from a transmitter and received through a quantum communication path;
cause the plurality of weak lights to be interfered with by the reference light the phase of which has been modulated, to thereby detect a plurality of pieces of bit information from each of the plurality of weak lights interfered with by the reference light in which a base value of the reception base matches that of the transmission base;
extract a plurality of pieces of bit information each having an amplitude component equal to or greater than a threshold from among the plurality of pieces of detected bit information;
acquire information about a weather forecast in an area where, among the quantum communication paths, a quantum communication path installed on the ground is present;
predict a load status of the receiver based on the information about a weather forecast; and
adjust the threshold in accordance with the predicted load status of the receiver.

(Supplementary Note 11)

A cryptographic key distribution system comprising:
a transmitter;
a receiver; and
a quantum communication path provided between the transmitter and the receiver, wherein
the transmitter comprises:

a light generation unit configured to generate a plurality of weak lights; and a first modulation unit configured to modulate phases of the plurality of weak lights one by one using bit information and a transmission base randomly selected in the transmitter, and transmit the plurality of weak lights the phases of which have been modulated to the receiver through the quantum communication path, and the receiver comprises:

a second modulation unit configured to modulate a phase of a reference light by using a reception base randomly assigned in the receiver so as to correspond to a transmission base that is randomly assigned to each of the plurality of weak lights transmitted from the transmitter and received through the quantum communication path;

a detection unit configured to cause the plurality of weak lights to be interfered with by the reference light the phase of which has been modulated by the second modulation unit, to thereby detect a plurality of pieces of bit information from each of the plurality of weak lights interfered with by the reference light in which a base value of the reception base matches that of the transmission base;

an extraction unit configured to extract a plurality of pieces of bit information each having an amplitude component equal to or greater than a threshold from among the plurality of pieces of bit information detected by the detection unit;

an acquisition unit configured to acquire information about a weather forecast in an area where, among the quantum communication paths, a quantum communication path installed on the ground is present;

a prediction unit configured to predict a load status of the receiver based on the information about a weather forecast; and an adjustment unit configured to adjust the threshold in accordance with the load status of the receiver predicted by the prediction unit.

(Supplementary Note 12)

The cryptographic key distribution system according to supplementary note 11, wherein the adjustment unit increases the threshold as a predicted processing load on the receiver increases, while the adjustment unit decreases the threshold as a predicted processing load on the receiver decreases.

(Supplementary Note 13)

The cryptographic key distribution system according to supplementary note 11, wherein when the information about a weather forecast includes information indicating that an amount of change in air temperature in a predetermined period will increase, the prediction unit predicts that the processing load on the receiver will increase, while when the information about a weather forecast includes information indicating that an amount of change in air temperature in a predetermined period will decrease, the prediction unit predicts that the processing load on the receiver will decrease.

(Supplementary Note 14)

The cryptographic key distribution system according to supplementary note 11, wherein when the information about a weather forecast includes information indicating that a wind speed will increase, the prediction unit predicts that the processing load on the receiver will increase, while when the information about a weather forecast includes information indicating that a wind speed will decrease, the prediction unit predicts that the processing load on the receiver will decrease.

(Supplementary Note 15)

The cryptographic key distribution system according to supplementary note 11, further comprising a monitoring unit configured to monitor the load status of the receiver, wherein the adjustment unit adjusts the threshold in accordance with the load status of the receiver monitored by the monitoring unit and the load status of the receiver predicted by the prediction unit.

(Supplementary Note 16)

The cryptographic key distribution system according to supplementary note 11, wherein the transmitter further comprises a first control unit configured to generate a first cryptographic key by using, among a plurality of pieces of bit information included in each of the plurality of weak lights the phases of which have been modulated by the first modulation unit, at least some of the plurality of pieces of bit information to which a transmission base, a base value of which matches that of a reception base assigned in the receiver, is assigned, and the receiver further comprises a second control unit configured to generate a second cryptographic key by using at least some of the plurality of pieces of bit information extracted by the extraction unit.

(Supplementary Note 17)

The cryptographic key distribution system according to supplementary note 11, wherein the quantum communication path is an optical fiber.

What is claimed is:

1. A receiver provided in a cryptographic key distribution system, the receiver comprising:

at least one receiving-side memory; and at least one receiving-side processor coupled to the at least one receiving-side memory, wherein the at least one receiving-side processor is configured to:

modulate a phase of a reference light by using a reception base randomly assigned so as to correspond to a transmission base that is randomly assigned to each of a plurality of weak lights transmitted from a transmitter and received through a quantum communication path;

cause the plurality of weak lights to be interfered with by the reference light the phase of which has been modulated, to thereby detect a plurality of pieces of bit information from each of the plurality of weak lights interfered with by the reference light in which a base value of the reception base matches that of the transmission base;

extract a plurality of pieces of bit information each having an amplitude component equal to or greater than a threshold from among the plurality of pieces of detected bit information;

acquire information about a weather forecast in an area where, among the quantum communication paths, a quantum communication path installed on the ground is present;

predict a load status of the receiver based on the information about a weather forecast; and adjust the threshold in accordance with the predicted load status of the receiver.

2. The receiver according to claim 1, wherein in the adjustment of the threshold, the threshold increases as a predicted processing load on the receiver increases, while the threshold decreases as a predicted processing load on the receiver decreases.

3. The receiver according to claim 1, wherein in the prediction of the load status, when the information about a weather forecast includes information indicating that an amount of change in air temperature in a predetermined period will increase, it is predicted that the processing load on the receiver will increase, while when the information about a weather forecast includes information indicating that an amount of change in air temperature in a predetermined period will decrease, it is predicted that the processing load on the receiver will decrease.

4. The receiver according to claim 1, wherein in the prediction of the load status, when the information about a weather forecast includes information indicating that a wind speed will increase, it is predicted that the processing load on the receiver will increase, while when the information about a weather forecast includes information indicating that a wind speed will decrease, it is predicted that the processing load on the receiver will decrease.

5. The receiver according to claim 1, wherein the at least one receiving-side processor is further configured to monitor the load status of the receiver, and in the adjustment of the threshold, the at least one receiving-side processor adjusts the threshold in accordance with the monitored load status of the receiver and the predicted load status of the receiver.

6. A method for controlling a receiver, the method comprising:

modulating a phase of a reference light by using a reception base randomly assigned so as to correspond to a transmission base that is randomly assigned to each of a plurality of weak lights transmitted from a transmitter and received through a quantum communication path;

causing the plurality of weak lights to be interfered with by the reference light the phase of which has been modulated, to thereby detect a plurality of pieces of bit information from each of the plurality of weak lights interfered with by the reference light in which a base value of the reception base matches that of the transmission base;

extracting a plurality of pieces of bit information each having an amplitude component equal to or greater than a threshold from among the plurality of pieces of detected bit information;

acquiring information about a weather forecast in an area where, among the quantum communication paths, a quantum communication path installed on the ground is present;

predicting a load status of the receiver based on the information about a weather forecast; and adjusting the threshold in accordance with the predicted load status of the receiver.

7. The method according to claim 6, wherein in the adjustment of the threshold, the threshold increases as a predicted processing load on the receiver increases, while the threshold decreases as a predicted processing load on the receiver decreases.

8. The method according to claim 6, wherein in the prediction of the load status, when the information about a weather forecast includes information indicating that an amount of change in air temperature in a predetermined period will increase, it is predicted that the processing load on the receiver will increase, while when the information about a weather forecast includes information indicating that an amount of change in air temperature in a predetermined period will decrease, it is predicted that the processing load on the receiver will decrease.

9. The method according to claim 6, wherein in the prediction of the load status, when the information about a weather forecast includes information indicating that a wind speed will increase, it is predicted that the processing load on the receiver will increase, while when the information about a weather forecast includes information indicating that a wind speed will decrease, it is predicted that the processing load on the receiver will decrease.

10. The method according to claim 6, further comprising monitoring the load status of the receiver, wherein in the adjustment of the threshold, the threshold is adjusted in accordance with the monitored load status of the receiver and the predicted load status of the receiver.

11. A cryptographic key distribution system comprising:

a transmitter;

a receiver; and a quantum communication path provided between the transmitter and the receiver, wherein the transmitter comprises:

at least one transmitting-side memory; and at least one transmitting-side processor coupled to the at least one transmitting-side memory, the at least one transmitting-side processor is configured to:

generate a plurality of weak lights; and modulate phases of the plurality of weak lights one by one using bit information and a transmission base randomly selected in the transmitter, and transmit the plurality of weak lights the phases of which have been modulated to the receiver through the quantum communication path, the receiver comprises:

at least one receiving-side memory; and at least one receiving-side processor coupled to the at least one receiving-side memory, and the at least one receiving-side processor is configured to:

modulate a phase of a reference light by using a reception base randomly assigned in the receiver so as to correspond to a transmission base that is randomly assigned to each of the plurality of weak lights transmitted from the transmitter and received through the quantum communication path;

cause the plurality of weak lights to be interfered with by the reference light the phase of which has been modulated, to thereby detect a plurality of pieces of bit information from each of the plurality of weak lights interfered with by the reference light in which a base value of the reception base matches that of the transmission base;

extract a plurality of pieces of bit information each having an amplitude component equal to or greater than a threshold from among the plurality of pieces of detected bit information;

acquire information about a weather forecast in an area where, among the quantum communication paths, a quantum communication path installed on the ground is present;

predict a load status of the receiver based on the information about a weather forecast; and adjust the threshold in accordance with the predicted load status of the receiver.

12. The cryptographic key distribution system according to claim 11, wherein in the adjustment of the threshold, the threshold increases as a predicted processing load on the receiver increases, while the threshold decreases as a predicted processing load on the receiver decreases.

13. The cryptographic key distribution system according to claim 11, wherein in the prediction of the load status, when the information about a weather forecast includes information indicating that an amount of change in air temperature in a predetermined period will increase, it is predicted that the processing load on the receiver will increase, while when the information about a weather forecast includes information indicating that an amount of change in air temperature in a predetermined period will decrease, it is predicted that the processing load on the receiver will decrease.

14. The cryptographic key distribution system according to claim 11, wherein in the prediction of the load status, when the information about a weather forecast includes information indicating that a wind speed will increase, it is predicted that the processing load on the receiver will increase, while when the information about a weather forecast includes information indicating that a wind speed will decrease, it is predicted that the processing load on the receiver will decrease.

15. The cryptographic key distribution system according to claim 11, wherein the at least one receiving-side processor is further configured to monitor the load status of the receiver, and in the adjustment of the threshold, the at least one receiving-side processor adjusts the threshold in accordance with the monitored load status of the receiver and the predicted load status of the receiver.

16. The cryptographic key distribution system according to claim 11, wherein in the transmitter, the at least one transmitting-side processor further comprises a first control unit configured to generate a first cryptographic key by using, among a plurality of pieces of bit information included in each of the plurality of weak lights the phases of which have been modulated, at least some of the plurality of pieces of bit information to which a transmission base, a base value of which matches that of a reception base assigned in the receiver, is assigned, and in the receiver, the at least one receiving-side processor is further configured to generate a second cryptographic key by using at least some of the plurality of pieces of the extracted bit information each having an amplitude component equal to or greater than the threshold.

17. The cryptographic key distribution system according to claim 11, wherein the quantum communication path is an optical fiber.

* * * * *